Patented Feb. 3, 1948

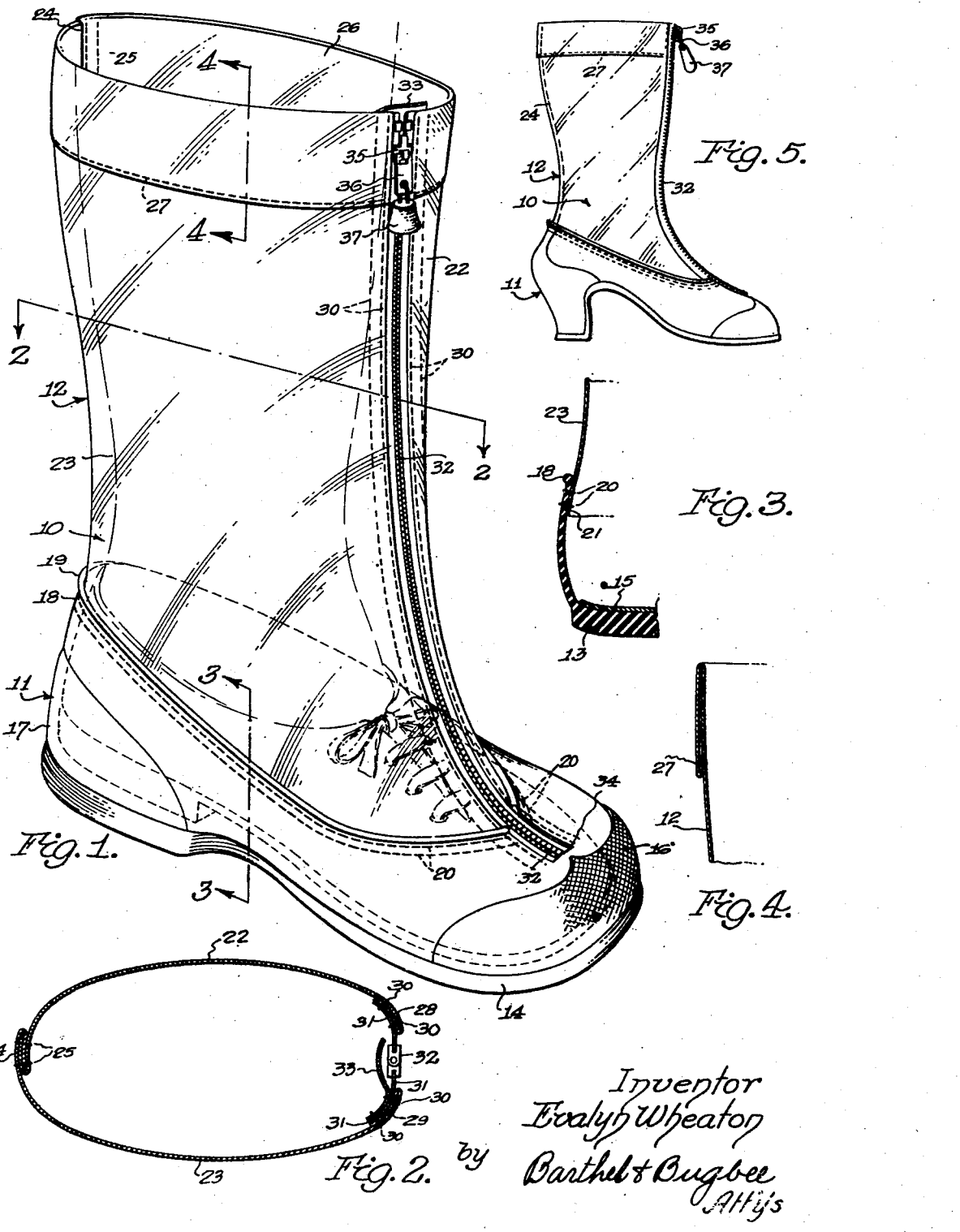

2,435,485

UNITED STATES PATENT OFFICE 2,435,485

OVERSHOE SEAMED TO STIFFEN PLASTIC UPPER

Evalyn Wheaton, Detroit, Mich.

Application November 13, 1945, Serial No. 628,118

1 Claim. (Cl. 36—7.3)

This invention relates to footwear, and in particular, to overshoes.

One object of this invention is to provide an overshoe having a top of transparent plastic material through which the shoe and hosiery are visible.

Another object is to provide an overshoe having a waterproof lower portion of rubber-like material and an upper portion of transparent plastic material which is closed by a slide fastener.

Another object is to provide an overshoe having a transparent upper which is closed by a slide fastener extending from a point near the toe up the front of the upper, thereby facilitating putting on the overshoe, especially by children.

Another object is to provide an overshoe having a transparent upper portion with a lower extension reaching close to the toe, and a slide fastener extending from the forward end of the extension up the front edge of the upper.

Another object is to provide an overshoe having a transparent upper comprising a pair of opposite side portions joined at the rear by an overlapping seam and at the front by a slide fastener, preferably with a protecting strip between it and the stocking.

Another object is to provide an overshoe having a transparent upper of plastic material, the top edge of which is turned over to provide a reinforcement.

Another object is to provide an overshoe having a transparent upper of slippery material on the inside surface so that dirt deposited thereon by inserting the shoe will not adhere easily and may be wiped off readily, so that the stocking is not soiled by such dirt, as in the cloth-topped overshoe.

Another object is to provide an overshoe having a transparent upper of slippery material on the outside surface, preferably a transparent plastic material, so that mud splattered thereon will not adhere readily and, if adhering, may be quickly and easily removed by merely wiping it off.

Another object is to provide an overshoe having a transparent upper of light-weight material, preferably of transparent plastic material, thereby protecting the shoes and stockings from mud spattering during the spring and fall seasons, yet providing a relatively cool and comfortable overshoe during such seasons where the ordinary type of overshoe would be heavy and uncomfortably warm.

Other objects and advantages of the invention will become apparent during the course of the following description of the accompanying drawing, wherein:

Figure 1 is a front perspective view of a child's overshoe according to the present invention, with the shoe itself shown in broken lines;

Figure 2 is a horizontal section along the line 2—2 in Figure 1;

Figure 3 is a vertical section along the line 3—3 in Figure 1, showing the means of joining the upper to the lower portion of the overshoe;

Figure 4 is a vertical section along the line 4—4 in Figure 1 showing the means of overlapping the top edge for reinforcement thereof; and Figure 5 is a side elevation of a modification showing the invention applied to a ladies' overshoe.

Referring to the drawing in detail, Figure 1 shows an overshoe generally designated 10 having a lower 11 and an upper 12. The lower 11 is preferably of rubber or rubber-like material, and is provided with a heel 13, a sole 14, an inner sole 15 (Figure 3), a toe reinforcement 16, and a back reinforcement 17. The upper edge 18 of the lower 11 terminates in a bead 19. Secured to the upper edge 18 as by the double row of stitches 20 is the lower edge 21 of the upper 12. Welding may also be used.

The upper 12 is formed of a pair of pieces 22 and 23 of transparent plastic material, such as those known under the trade-names of Pliofilm and Vitafilm, and these are joined together at the back by a vertical seam 24 formed by overlapping the adjacent edges (Figure 2) and securing them together as by the stitches 25. The resulting seam thereby forms not only a junction but also a reinforcement. The top edge 26 of the upper 12 is folded over and secured as at 27, such as by stitches, thereby forming a reinforcement. The seam and the hem may also be formed by welding.

The front edges 28 and 29 of the upper sides 22 and 23 are folded over (Figure 2) and secured as at 30 to the carrier portions 31 of a slide fastener 32. A protecting flap 33 is also secured to the edge 29 to protect the stocking from the slide fastener and at the same time to intercept any moisture which might get through the slide fastener. The latter is extended as at 34 through the toe portion of the lower 11 almost to the toe thereof, thereby facilitating the putting on and removal of the overshoe. The slide fastener 32 is operated by the usual slider 35 having a tab 36 and optionally a handle 37 to facilitate grasping. The latter may be in the form of an ornament, such as a bell.

The modification shown in Figure 5 is similar in construction broadly to that of Figure 1, except that the invention is there applied to a ladies' overshoe, and corresponding parts are designated with corresponding reference numerals.

Thus, the invention provides an overshoe with a lower portion of rubber-like material and an upper portion of transparent plastic material which is closed by a slide fastener extending down to the toe of the lower portion. The transparent portion may be colorless or it may be provided in various colors, thereby increasing the attractiveness thereof and providing style appeal. The lower portion 11 may also be furnished in colors, further enhancing the appearance and style of the overshoe. The transparent upper is waterproof and windproof, and is also very light in weight, thereby making it easy for a child to wear, and also providing protection while making it cool and comfortable to wear, especially during mild seasons of the year. The slippery nature of the material minimizes the adhesion of dirt to the outside or the inside of the upper.

Furthermore, instead of being stitched together, the parts of the overshoe which include transparent plastic material may alternatively be welded by the application of heat or cemented by a suitable adhesive. Moreover, the upper portion requires no additional stiffening members, because the slide fastener and the overlapped seam at the rear provide sufficient stiffening in themselves.

While I have shown and described my invention in detail, it is to be understood that the same is to be limited only by the appended claim, for many changes may be made without departing from the spirit and scope of my invention.

What I claim is:

An overshoe comprising a lower portion of rubber-like material shaped to fit over a shoe, an upper portion having a height a plurality of times the height of the lower portion and composed substantially in its entirety of two pieces of transparent plastic material having their bottom edges secured to the upper edge of said lower portion and having their vertical rear edges turned back, the turned back edges being disposed in interleafed relation and secured together to form a seam, and a slide fastener secured to and closing the vertical forward edges of said upper portion.

EVALYN WHEATON.

REFERENCES CITED

The following references are of record in the file of this patent:

UNITED STATES PATENTS

| Number | Name | Date |
|---|---|---|
| 39,865 | Simnson | Sept. 8, 1863 |
| 133,826 | Bracket et al. | Dec. 10, 1872 |
| 1,208,772 | Goodyear | Dec. 19, 1916 |
| 1,601,672 | Bott et al. | Sept. 28, 1926 |
| 1,604,954 | Artz | Nov. 2, 1926 |
| 1,717,690 | Ihnen | June 18, 1929 |
| 1,717,790 | L'Hollier et al. | June 18, 1929 |
| 1,724,450 | Callahan | Aug. 13, 1929 |
| 1,823,518 | Walker | Sept. 15, 1931 |
| 2,250,794 | Finegan | July 29, 1941 |
| 2,347,191 | McGillicuddy | Apr. 25, 1944 |